United States Patent Office 2,769,771
Patented Nov. 6, 1956

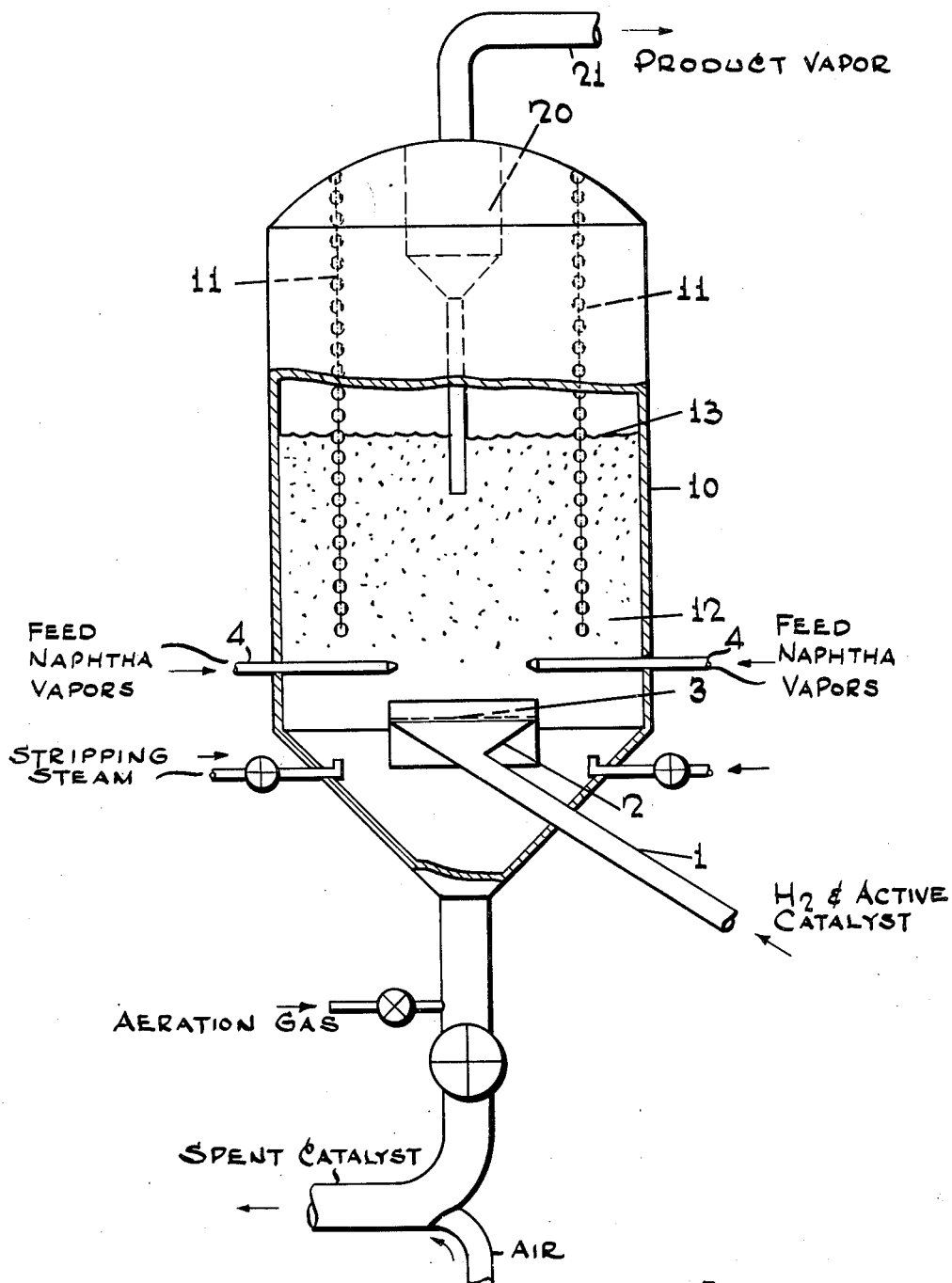

2,769,771

CONTACTING OF GASES WITH FLUIDIZED SOLIDS WITH THE USE OF CHAINS IN THE FLUIDIZED BED

Lindsay I. Griffin, Jr., Baton Rouge, La., assignor to Esso Research and Engineering Company, a corporation of Delaware Application December 10, 1952, Serial No. 325,200

1 Claim. (Cl. 196—52)

This invention relates to an improvement in contacting gases with finely divided fluidized solids. More particularly it relates to a device and method for equalizing the energy distribution in a dense bed of fluidized solids.

In a fluid catalytic process or in any system employing fluidized solids, it is usually desirable to have uniform contacting of the fluidizing gases with the solid. In the absence of such uniformity a part of the feed tends to be over-contacted while another part may be under-contacted. Also uneven fluidization tends to result in non-uniform temperature distribution, thereby causing further deviations from optimum reaction conditions. The unevenness of contacting is largely the result of formation of gas bubbles in the dense, fluidized solids. Such gas bubbles, which are substantially free of solids, rise at a higher than average velocity through the dense fluidized bed which consists of a continuous phase containing a relatively high ratio of solids to gas. Consequently, the portion of the gas forming the bubbles passes through the reaction zone in less than the optimum reaction time and under other than optimum temperature conditions.

It has been proposed previously to improve gas-solids contacting in fluid beds by means of baffles or grid plates installed across the cross-section of the fluidizing vessel at frequent intervals. This breaks up the bubbles and redistributes the gas between the newly formed bubbles and the denser phase. However, while effective, this method introduces an undesired pressure drop across each baffle. Also, it becomes expensive and difficult to install in large vessels without disturbing other desirable characteristics of the fluid bed, such as isothermal conditions. Such internal obstruction also complicates maintenance work within the unit.

Alternatively it has been proposed to improve contacting by installing externally driven rotating or oscillating agitators within fluidizing vessels. While very effective, this is usually expensive and difficult to carry out in plant-scale equipment and may involve serious maintenance problems.

It is the object of the present invention to improve contacting of gases with finely divided solids, without consumption of pressure and without externally driven moving parts. Another object is to devise an improved apparatus for such contacting. These and other objects will become more clearly apparent from the subsequent description and attached drawing.

The drawing shows a view in elevation and partial section of an apparatus embodying the present invention in one of its simplest forms.

The present invention consists of chains or similar flexible bands which are fastened in a fluidizing vessel so as to dangle loosely in the dense phase of fluidized solids and so that the chains are moved about by the turbulent motion of the fluid bed. This breaks up the tightly compacted solid particles which make up the skin of the bubbles and which permit the bubbles to exist. In this way the bubbles are constantly being collapsed so that interchange of gas from the dense continuous phase to the dilute bubble phase is always occurring at a fast rate. Consequently, the chances of any gas molecules passing through the fluid bed without intimate contact with the solid phase are greatly diminished, and uniformity of reaction and temperature distribution is improved.

Without some bubble formation, however, little or no backmixing of solids will occur. This lack of backmixing results in undesirable temperature gradients as well as in inequalities in "oil-on-catalyst" time. Hence, it is apparent that for a given fluidized bed, superficial velocity, and reaction desired, there exists an optimum bubble size. By spacing the chains at a distance slightly greater than this optimum bubble diameter, any bubbles coalescing to larger than desired dimensions will be again reduced to suitable size. Thus the chains should be spaced at least one inch apart, and in general spacing of about 4 to 12 inches apart will be most practical in commercial size equipment. The specific weight and dimensions of the chains are fixed only to the extent that the bed must readily move the chain yet the tightly compacted solid particles which make up the roof of the bubbles must not be capable of completely deflecting the chain. Thus, chains having specific weights ranging from about 1 to 10 lbs. per linear foot have been used in fluid beds, and lighter as well as heavier chains may be found similarly practical. In general, relatively heavier chains can be used in fluid beds having a relatively great apparent density, and vice versa.

The chain may be made of any material suitable for the particular reaction and temperature involved. For instance, in high temperature conversion of hydrocarbons the chain may be made of steel, whereas in low temperature reactions involving a corrosive atmosphere the chain may be made of a suitably loaded plastic, e. g. of vinyl chloride-acetate polymer compounded with lead oxide or the like. Also, instead of using a chain made of individual links, it is feasible to use other resilient bands, e. g. braided cable, or a weighted barbed wire, or pliant plastic band. Resilient coil springs may also be used, particularly at low or moderate temperatures.

It will also be understood that, especially in large vessels, the chain or equivalent flexible device may either be suspended directly from the roof of the vessel, or it may be attached to a support, e. g., to a vertical cable or rod extending downwardly from the roof of the vessel to a point near the dense phase level. Alternatively, it is also feasible to use vertical or looped chains suspended from a horizontal cable or rod fastened to opposite sides of the vessel at or near the dense phase level. In still another possible arrangement, chains may be fastened more or less horizontally to opposite sides of the vessel at one or more levels in the dense bed and having a sufficient slack to allow the desired motion of the chains within the bed. If desired, such chain loops may be criss-crossed in the form of a net or several superposed nets. However the vertical, loosely hanging chains are generally preferred because they make for particularly easy maintenance work inside the reactor. Also, a vertical chain tends to give a greater effect than a similar chain in a horizontal position. Still other arrangements of carrying out the present invention may be thought of by persons skilled in the art.

The invention will now be described with reference to the attached drawing which illustrates a vessel suitable for the hydroforming of hydrocarbons. Referring to the drawing a feed mixture of hydrogen and/or recycle gas and powdered catalyst such as molybdena-alumina catalyst is passed through line 1, inlet cone 2 and distributing grid 3 into the lower part of the reaction vessel 10. Naphtha feed is introduced in vaporized form via nozzles 4. The catalyst may be present in the reaction vessel 10 in a ratio of about 0.5 to 20 pounds per pound of hydrocarbon. The vapors pass up through vessel 10 at a superficial linear velocity of about 0.5 to 5 ft./sec., preferably 0.5 to 3 ft./sec. This causes hindered settling of the catalyst particles so that they form a dense fluidized bed 12 having a level 13 in the intermediate portion of the reactor. This fluidized bed may have an apparent density of about 10 to 50 lbs./cu. ft. A more disperse phase of catalyst in vapor exists above the dense bed level 13 and this disperse phase may have a density of about 0.01 to 5 lbs./cu. ft. As the gas oil vapors pass upwardly through the reactor at a temperature of about 800 to 1000° F., and a pressure of about 25 to 700 p. s. i. g., they become converted into more valuable products. The product vapors are withdrawn through a dust separating device such as cyclone 20 and finally passed through product line 21 to a conventional recovery system, all of which is well known.

The essence of the present invention lies in carrying out such a process in the presence of the one or more chains 11 which are fastened to the reactor and dangle into the dense fluidized bed 12. There they are moved about by the ebullient motion of the fluidized bed and break up the gas bubbles which form in the bed, in the manner described earlier herein.

Of course, while the invention has been exemplified above specifically with reference to hydroforming of hydrocarbons, it will be understood that it is similarly applicable to other processes employing fluidized solids, substantially regardless of temperature, pressure and reagents involved. Catalytic cracking of hydrocarbons and coking of residual oil are other instances where the present invention may be particularly helpful. The following example demonstrates the effectiveness of the invention in reducing bubble formation, and hence in improving contacting efficiency of fluid beds.

*Example*

About 2½ liters of a commercial hydroforming catalyst containing about 10% molybdena impregnated on low soda gamma alumina and composed of about 20 weight percent of 10 to 20 micron size particles, about 20% of 20 to 40 micron size particles, 25% of 40 to 80 micron size particles, and about 35% of particles larger than 80 microns was charged into a test vessel. This vessel consisted essentially of a vertically arranged glass tube 2 inches in diameter and more than 90 inches long, and was fitted at the bottom with a fritted disk to serve as a gas distributor. The catalyst formed a settled bed 47 inches deep. This bed was fluidized by passing air upwardly through the vessel at a superficial velocity of 1 foot/sec. Two comparative tests were made, with and without a single steel sprocket chain suspended from above and extending essentially to the bottom of the vessel. The chain was made up of 1½" x ⅝" wire links and weighed 0.18 pound per linear foot.

Fluidization was measured in each run by a capacitance probe which measured the density of the material between two parallel, vertical plates inserted in the fluid mass. This density is indicated on the record of capacitance-versus-time by the ratio of time at high capacitance to that at low capacitance. Since the capacitance decreases sharply as a bubble begins to pass between the probe plates and increases as the catalyst re-enters the space between the probe plates, a time proportional to that required for a bubble of average diameter to pass a given point may be determined. If it is assumed that the bubbles travel at a rate proportional to the known superficial velocity, a distance proportional to the average bubble diameter may be calculated.

Without the chain, it took 0.59 seconds for the average bubble to pass the probe at a level 67 inches above the distributor plate, whereas with the chain it took only 0.33 seconds. Since the bubble rate of travel is fixed by the superficial gas velocity, it is apparent that the average diameter of the bubbles has been decreased. This is also apparent from the capacitance probe record which indicates an increase in bubble frequency. The overall average density of the fluid bed as indicated by average bed height for a given weight of solids charged was increased by the addition of chains. The average fluidized bed heights were 81 inches without the chain and 73-74 inches with chain in the two-inch diameter vessel, thus indicating less of the gas to be in the form of bubbles. At the same time, however, the density of the fluidized mass between bubbles was found to decrease when determined by the maximum capacitance obtained. This indicates that some of the gas from the bubbles broken by the chain becomes much more intimately mixed with the solid material. The decrease in average density between bubbles due to the addition of the chain was 8% as determined by the capacitance probe. With another sample of catalyst, the average bubble passed the probe in 0.51 seconds in the absence of a chain, and 0.36 seconds with the chain. At the same time the chain decreased the dense phase density by about 15%. It is interesting to note that even with the chain the gas bubbles escape from the bed rapidly, despite their reduced size. This is probably due to the decreased density of the gas-solids mixture through which the bubbles must rise.

Analogous tests with a 1" x ¾" welded steel chain weighing 5.2 lbs./ft. gave substantially the same results.

In similar tests the aforementioned catalyst was charged to a 4-inch diameter column to form a settled bed 24 inches deep. Two of the welded chains were suspended from above about two inches apart and the bed was fluidized with air at a velocity of 1 foot/sec. In comparison with a similar test made without chains, the presence of the chains reduced the average fluidized bed height from about 37.5 to 35.5 inches, and capacitance readings again indicated a materially reduced bubble size and increased bubble frequency, that is, bubble subdivision was obtained as desired.

In all cases there was less high pitching or erupting of the bed with than without the chains. Although somewhat more pronounced slugging was observed in the four-inch vessel with two chains than in the one-inch vessel with one chain, it will be noted that larger bubbles can be generally tolerated, in fact are often desired, with fluidized beds having a relatively large diameter. Thus actual chain spacing is related to bed diameter, closer spacing being preferred in small vessels than in large ones.

Having described the invention and illustrative ways of carrying it into effect, patent protection is sought therefor within the scope and spirit of the appended claim.

The claim:

In a process for converting hydrocarbons at conversion conditions wherein gasiform hydrocarbons are contacted with finely divided solids by introducing finely divided solids into the lower portion of a conversion zone and by introducing a gasiform hydrocarbon into the lower portion of said conversion zone at a fluidizing velocity to maintain a dense turbulent fluidized bed of solids having a disperse phase of solids thereabove and gasiform hydrocarbons after contacting is withdrawn from said dilute phase and solids after contacting are withdrawn from said conversion zone and large gas bubbles are formed in said dense fluidized turbulent bed of solids to give uneven and poor contacting between the solids and gasiform hydrocarbon, the improvement which comprises contacting the dense fluidized bed of solids with a plurality of spaced dangling and movable chains fixedly attached at one end and extending downwardly in spaced parallel relation a substantial distance below the level of the dense fluidized bed of solids to break up large gas bubbles as they pass upwardly within said dense fluidized bed of solids into smaller gas bubbles to improve contacting between said solids and gasiform hydrocarbon and causing movement of said chains within said dense fluidized bed of solids solely by the turbulent motion of the turbulent dense fluidized bed of solids.

References Cited in the file of this patent

UNITED STATES PATENTS

| | | |
|---|---|---|
| 1,650,169 | Wallace et al. | Nov. 22, 1927 |
| 1,836,325 | James | Dec. 15, 1931 |
| 1,960,972 | Grimm et al. | May 29, 1934 |
| 2,359,310 | Hemminger | Oct. 3, 1944 |
| 2,635,949 | Fenske et al. | Apr. 21, 1953 |
| 2,656,304 | McPherson et al. | Oct. 20, 1953 |

FOREIGN PATENTS

| | | |
|---|---|---|
| 277,404 | Great Britain | Sept. 8, 1927 |